(12) United States Patent
Hill et al.

(10) Patent No.: US 6,453,155 B1
(45) Date of Patent: Sep. 17, 2002

(54) SHAPEABLE COMMUNICATION DEVICE

(75) Inventors: Thomas C. Hill, Crystal Lake, IL (US); Michael L. Charlier, Palatine, IL (US)

(73) Assignee: Motorola, Inc., Schaumburg, IL (US)

( * ) Notice: Subject to any disclaimer, the term of this patent is extended or adjusted under 35 U.S.C. 154(b) by 84 days.

(21) Appl. No.: 09/705,845

(22) Filed: Nov. 3, 2000

(51) Int. Cl.⁷ .................................................. H04M 1/00
(52) U.S. Cl. ..................... 455/90; 379/430; 379/433.01; 379/433.12; 379/433.13
(58) Field of Search ................................. 455/90; 379/430, 379/433.01, 433.12, 433.13

(56) References Cited

U.S. PATENT DOCUMENTS

| | | | | |
|---|---|---|---|---|
| 5,251,189 A | * | 10/1993 | Thorp | 368/4 |
| D389,829 S | * | 1/1998 | Showers | D14/138 |
| 6,035,035 A | * | 3/2000 | Firooz | 379/433 |

* cited by examiner

*Primary Examiner*—Daniel Hunter
*Assistant Examiner*—Alan T. Gantt
(74) *Attorney, Agent, or Firm*—Brian M. Mancini

(57) ABSTRACT

A shapeable communication device is provided. The communication device comprises a communication module and a shapeable material. A system incorporating the device and methods for using the device are also provided.

26 Claims, 6 Drawing Sheets

SHAPEABLE COMMUNICATION DEVICE

FIELD OF THE INVENTION

This invention relates to communication devices, particularly wireless phones, and accessories that be used to coordinate and access data from a variety of sources such as telecommunications networks, electronic networks and cellular networks. In particular, this invention provides a portable, preferably wireless, communication device that can be easily formed into a variety of shapes in order to provide the maximum in user-personalized experience. The invention also provides a method of personalizing the shape of a communication device.

BACKGROUND OF THE INVENTION

One limitation currently facing users of wireless devices is the "one size fits all mentality" of the wireless industry. That is, current wireless devices come in only one configuration per device. These devices are generally hard-shell plastic forms that can not be conducive to users' needs or personal preferences. For example, existing wireless telephones can be of unwieldy length or width for a given user. Yet existing phones cannot be modified to better suit the user.

Some wireless devices, such as cellular phones, offer a degree of user personalization. For example, some cell phones offer faceplates in different colors and designs. These faceplates can be used to change a phone's original factory issue color. However, such phones are still standardized in shape and size.

Additionally, available wireless devices are generally suited for a limited range of purposes. For example, a wireless device that is suitable for use "on-the-go" use does not have a suitable shape for conference calling.

It would be desirable therefore, to provide an easily personalized wireless device that would be conformable to users' needs and tastes.

It would further be desirable to provide a wireless device available in a variety of sizes and personalization options.

It would further be desirable to provide a wireless device that could be used in one shape for one instance, such as "on-the-go" and could then be changed to another shape, for a different instance, such as for conference calling.

DETAILED DESCRIPTION OF THE PRESENTLY PREFERRED EMBODIMENTS

Figure 1:
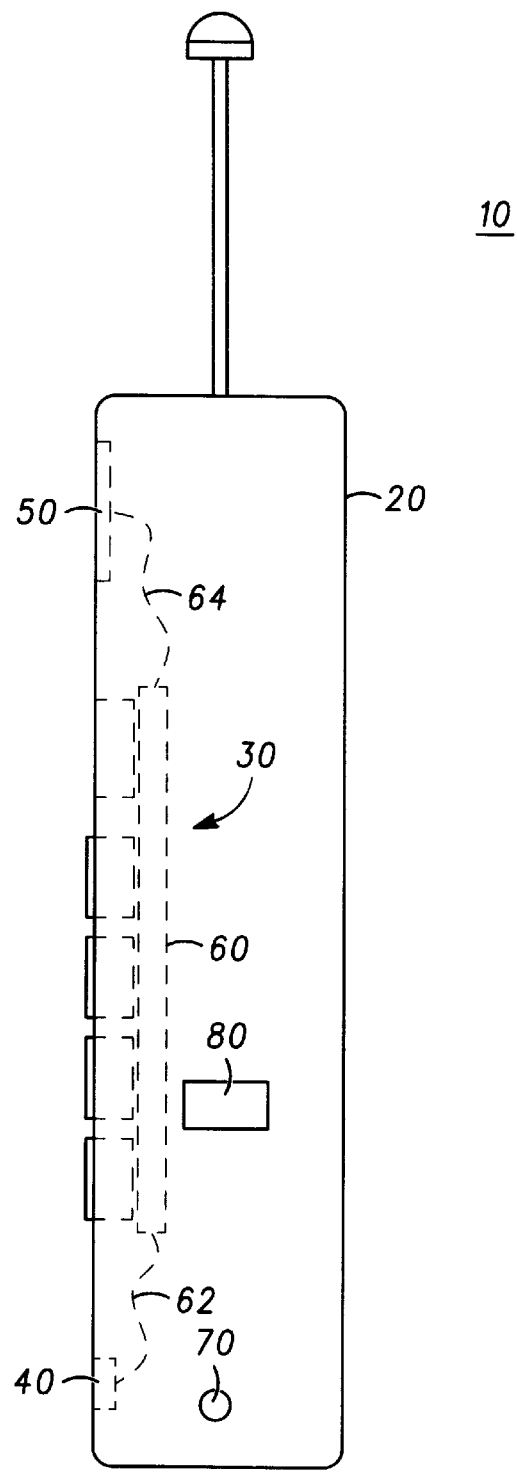
FIG. 1 is a cross-section of a shapeable communication device in accordance with the present invention.

FIG. 1 shows a cross-section of one embodiment of a communication device in accordance with the present invention at 10. Communication device 10 comprises a shapeable material 20 and a communication module 30. Communication module 30 be embedded within the shapeable material 10 as shown in FIG. 1. Alternatively, module 30 be placed in any suitable location on or in material 20.

Shapeable material 20 be any suitable material that provides form to device 10 and is flexible enough to be manipulated by a user. Shapeable material be material that is capable of being molded into a shape and will then retain that shape until it is molded into another shape. Such material 20 be, for example, a gel, a gel contained within a pack, putty, putty contained within a pack, sand contained within a pack or bendable plastic. The shapeable shell 20 be made of a polyurethane film. This film can be filled with a gel or beads or other elements to lend it additional form. The gel can not necessarily be a pure gel. It be plastic beads or other elements contained within a gel. The shell be a shapeable foam or foam derivative, particularly a foam that enhances grippability.

Material 20 and module 30 be made of the same or different materials. In one embodiment of the invention, material 20 is of an inexpensive material. Thus, device 10 be disposable. Material 20 be made of an inexpensive material that be easily discarded and replaced with different types of shells. Communication module 30 however, be interchanged within these shells.

Module 30 can be placed within or on material 20 using any suitable means. For example, module 30 can be embedded within material 20. Material 20 can be placed, for example by pouring or shaping, around module 30. Module 30 can be glued into or onto material 20 or adhered using any suitable adhesive such as, for example, double sided adhesive tape. Module 30 can be attached to material 20 by suitable means, including screws. In one embodiment, material 20 is manufactured so that module 30 or components of module 30 can be press-fitted or snap-fitted into material 20. In this manner, although material 20 is flexible, module 30 and/or its components maintain the appropriate connections for functionality.

Module 30 can be any suitable communication module that enables device 10 to communicate with other devices and systems. For example, module 30 can be a wireless module. Such a wireless module can be one unit incorporating user-input interfaces, user-output interfaces and processing components or other components. Alternatively, wireless module can comprise a plurality of components in communication with each other.

Module 30 can also be a chip set. Alternatively, a chip set can be one component of module 30. Such a chip set can be, for example a chip set for a short range wireless device. One such chip set is Bluetooth. For example, a chip set module can be used according to the Bluetooth protocol, as is well known in the art.

Module 30 can also be a wireless cellular transceiver module. Alternatively, a wireless cellular transceiver module can be one component of module 30. Such a module can be, for example, a CDMA module, a TDMA module, a GSM module, or an iDEN module. For example, a wireless cellular transceiver module can be used according to a CDMA protocol, as is well known in the art.

Module 30 can be one complete piece or it can comprise a plurality of components that are connected. That is, each component can be connected to one or more of the other components. Alternatively, each component can be connected to a core component. For example, in one embodiment of device 10, the core component of module 30 could be indicated at 60. Other components can then be connected to core component 60.

In one embodiment, core component 60 is a radiofrequency module. For example, core component 60 can be a chip set appropriate for use in a shortrange wireless device as described above. One example of such a chip set is Bluetooth. Core component 60 can also be a wireless cellular transceiver as described above. One example of such a wireless cellular transceiver is CDMA. Core component 60 is fitted, for example by press-fitting or snap-fitting into material 20 so that component 60 maintains its integrity while material 20 is shapeable.

In one embodiment, core component 60 is connected to one or more input or output interfaces or to other components by connections 62, 64. These connections 62, 64 can be any suitable connections such as electrical or mechanical connections. Alternatively core component 60 and other components of device 10 can communicate without connections, for example, via Bluetooth technology. The connections 62, 64 between core component 60 and other components are also fitted into material 20 in such a manner that the connections 62, 64 maintain their integrity while material 20 is shapeable.

For example, in one embodiment, core component 60 is a transceiver. Transceiver 60 includes connections 62, 64 for one or more input or output devices or data links. These connections can be any of electrical, mechanical, strip-line and wireline connections.

Alternatively, these connections can be wireless. For example, the connections can use radio frequency connection of data between core component 60 and one or more user-input interfaces 40, user-output interfaces 50, data links 80 or other devices. Alternatively, these connections can use Bluetooth connection of data between core component 60 and one or more user-input interfaces 40, user-output interfaces 50 or data links 80. In the case of Bluetooth connections, each interface 40, 50, 80 is trained to look for and communicate with core transceiver 60. Additionally, in the case of Bluetooth connections, each interface 40, 50, 80 can have its own power source (not shown).

For example, module 30 can include a user-input interface 40. Module 30 can also include a user-output interface 50. User-input interface 40 and user-output interface 50 can include both internal and external components necessary for the interfaces to function appropriately.

Furthermore, module 30 can include one or more processing units 60. In one embodiment, processing unit 60 serves as the core component of module 30. As seen in FIG. 1, the processing unit can receive input from one or more of the interfaces described above. These interfaces can be interconnected via suitable connections 62, 64. These interfaces can also be suitable connected to a core component such as processing unit 60. Module 30 can also include one or more power sources 70. Module 30 can also include one or more remote data links 80.

Power source 70 of device 10 can be any conventional power source, including, for example, a rechargeable battery or standard DC power source. Power source 70 can be, for example, fuel cells. Additionally, in a disposable embodiment of device 10, the power source 70 can be a battery of limited duration and power such as, for example, disposable batteries. Power source 70 is fitted, for example by press-fitting or snap-fitting into material 20 so that power source 70 maintains its integrity while material 20 is shapeable.

The processing unit 60 of module 30 can include, for example, a processor bus and/or microprocessor. Processing unit 60 can coordinate and manage one or more of the components, including the user-input interfaces and user-output interfaces, named above. In one embodiment of device 10, processing unit 60 can operate computer readable code that is capable of managing a variety of communication functions. Processor 60 can also incorporate a radiofrequency device such as a chip set, a Bluetooth chip set or a CDMA module. Processor 60 is fitted, for example by press-fitting or snap-fitting into material 20 so that component 60 maintains its integrity while material 20 is shapeable.

The user-input interface 40 serves to receive input from the user. The user-input interface 40 of device 10 can include, but is not limited to, an electroacoustic transducer or other voice communication device, such as a microphone, to receive voice and other audible input from the end user, any other voice communication device, a keypad or a keyboard to receive key strokes from the end user, a touchpad or touchscreen to receive touch input from the end user, a pointing device, such as a mouse or a trackball, to receive point and click inputs from the end user, and a variety of remote data links. User-input interface 40 can also be a pressure transducer so that a user can squeeze the interface and the transducer would sense the force as an input. User interface 40 can also be a camera, such as a CCD camera. Internal portions of user-input interface 40 are fitted, for example by press-fitting or snap-fitting into material 20 so that interface 40 maintains its integrity while material 20 is shapeable.

The user-output interface 50 serves to provide output to the user. The user-output interface 50 of the communication device 10 can include, but is not limited to, an electroacoustic transducer, such as a speaker, to provide voice and other audible output to the end user, and a visual display device, such as a liquid crystal display or a cathode ray tube, to provide graphical and/or textual information to the end user. The user-output interface 50 can also be a variety of remote data links. Internal portions of user-output interface 50 is fitted, for example by press-fitting or snap-fitting into material 20 so that interface 50 maintains its integrity while material 20 is shapeable.

Shapeable communication device 10 can include more than one user-input interface 40 and more than one user-output interface 50. For example, a wireless telephone can have a microphone, a telephone keypad, a speaker, and a visual display device. Shapeable communication device 10 can include a user-output interface without a user-input interface (i.e., a one-way paging unit). Shapeable communication device can also include one or more interfaces which act as both user-output and user-input interfaces.

Figure 2:
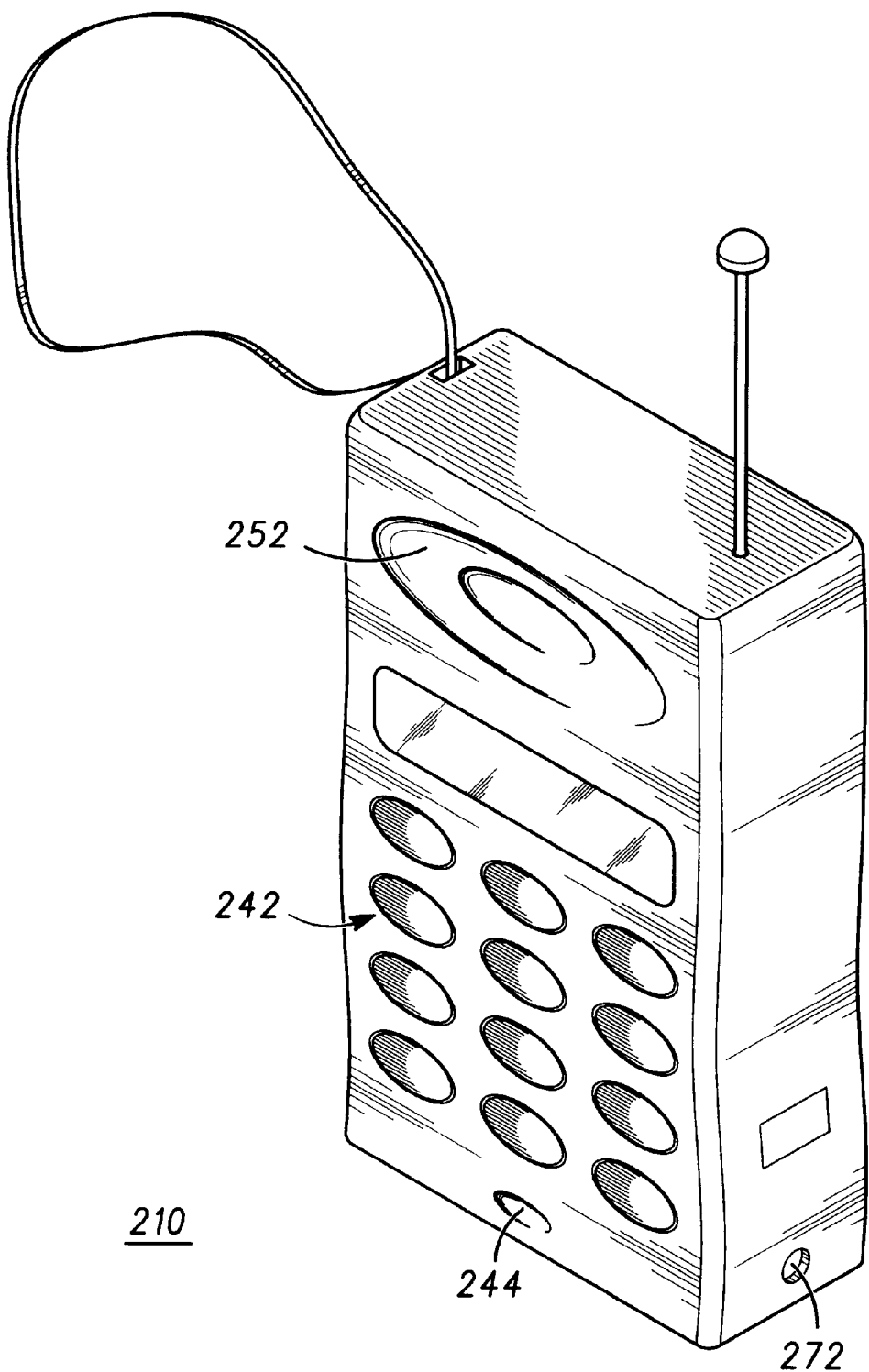
FIG. 2 is a perspective view of the shapeable communication device of FIG. 1 in a first configuration.

FIG. 2 shows one embodiment of a communication device in accordance with the present invention at 210. In FIG. 2, the communication module is completely encapsulated within the material and thus not visible. In the configuration of FIG. 2, device 210 is compressed to fit in a smaller volume. In particular, it is shown compressed from top to bottom, but the compression can also occur along any axis or angle.

Components of the communication module, such as internal elements of the user-input and user-output interfaces, are also not visible in FIG. 2 although external elements of these components can be visible and accessible to the user. For example, one element of a user-input interface is visible and accessible as a keypad 242. Another user-input interface is visible and accessible as speaking holes 244 into which a user can enter audible data. One user-output interface is visible and accessible as listening holes 252 through which a user can hear audible data. Meanwhile, internal components of module are fitted within the material of the device, for example by press-fitting or snap-fitting so that the internal components maintain their integrity as material is shaped.

Device 210 can include a power source as described above. The power source can also have an external component. For example, if the power source is a DC power source, the source can be plugged into device 210 at power jack 272. Alternatively, power jack 272 can be used to connect device 210 to a rechargeable energy source such as a battery source or solar generator.

Figure 3:
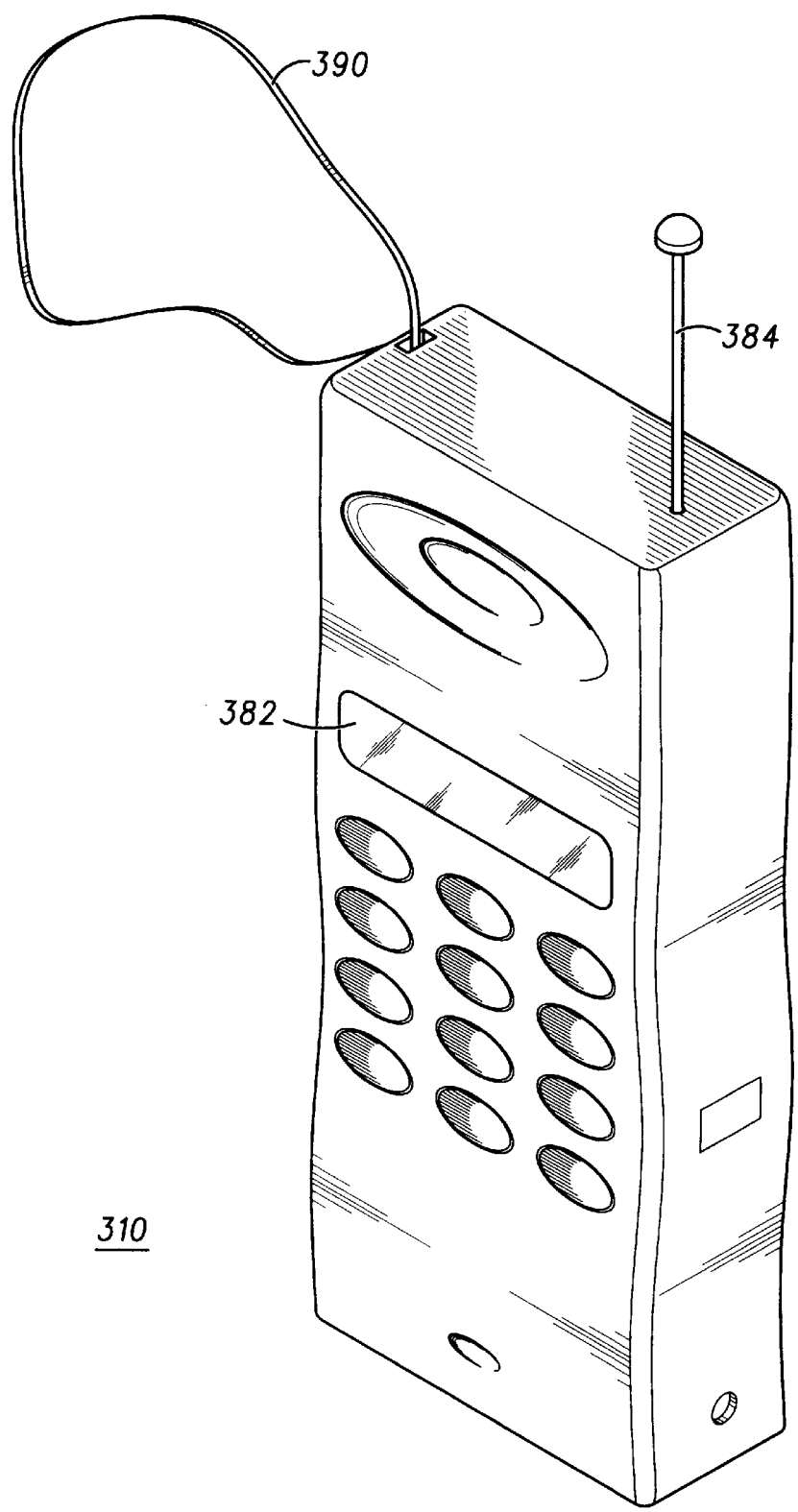
FIG. 3 is a perspective view of the shapeable communication device of FIG. 1 in a second configuration.

FIG. 3 shows one embodiment of the communication device of the present invention in a different configuration at 310. In the configuration of FIG. 3, the material or shell 320 of device 310 is expanded into an appropriate length to reach a user's mouth at one end and a user's ear at the other end. In particular, it is shown expanded from top to bottom, but the expansion can also occur along any axis or angle.

The shapeable nature of communication device 10 allows one device to have a variety of shapes. For example, the same device 10 could be shaped to have the configuration shown in FIG. 2 and then be re-shaped to have the configuration shown in FIG. 3. Thus, a device in the configuration of FIG. 2 can be suitable for holding in the palm of a user's hand or can give device a compact size convenient to fit into a user's purse or pocket. The same device can then be shaped to the configuration of FIG. 3 for a more comfortable or familiar size for a prolonged conversation. Alternatively, the material of the device can be gripped to mold the device to a user's hand, or to take on a more cylindrical shape.

Device 10 can incorporate one or more data links that could serve as user-input interfaces or as user-output interfaces. For example, a user could input data via a short-range RF data link device shown in shadow at 382. This RF data link device 382 could be, for example, an internal RF antenna. Typical short-range RF data links 382 are available commercially under the names Bluetooth and IEEE802.11.

Additionally, shapeable communication device 310 can comprise data links operatively adapted to communicate over cellular wireline or wireless frequencies, such as, for example, cellular antenna 384. In the device 310 shown in FIG. 3, cellular antenna 384 can be retractable although different configurations, such as an internal cellular link, are also possible. In one embodiment, cellular antenna 384 is fixed or is a "stubby" antenna. In one embodiment, cellular antenna 384 can interact with a cellular data modem so that a user could input information into device 10 over cellular phones lines or alternatively, output information from device 10.

Device 310 can also include a handle or strap 390. Such a handle can increase grippability or portability. The handle can be an elongated strap to allow device 310 to be worn around the user's neck. For example, if device 310 is in the configuration shown in FIG. 2, it can fit neatly on a necklace-like strap or handle.

Figure 4:
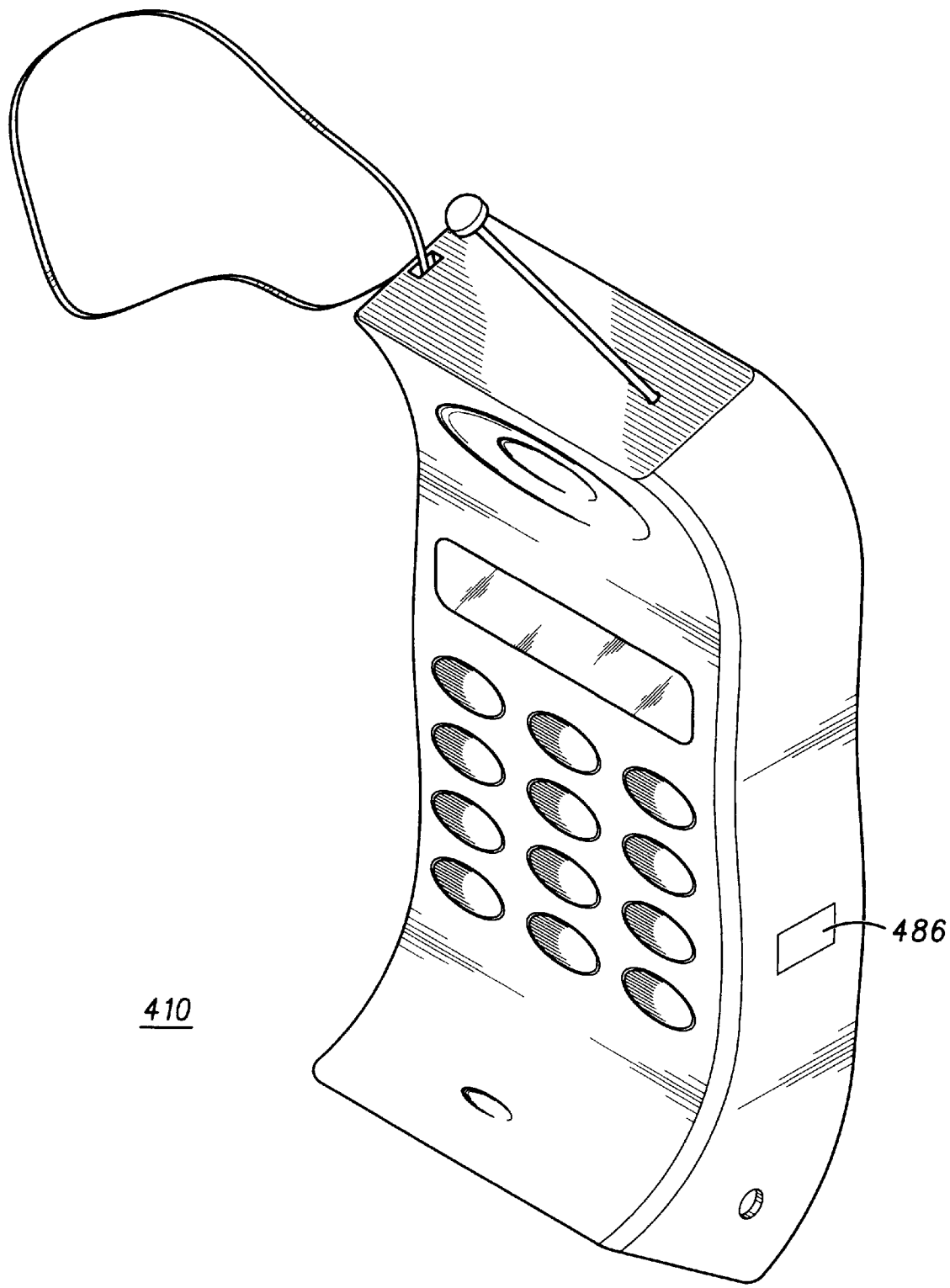
FIG. 4 is a perspective view of the shapeable communication device of FIG. 1 in a third configuration.

FIG. 4 shows another configuration of the shapeable communication device of the present invention at 410. In the configuration of FIG. 4, the material or casing 420 of device 410 is slightly bent forward and backward to resemble, for example, a boomerang or a traditional telephone. Such a configuration can be more comfortable for some users than the configurations of FIG. 2 or 3.

As seen in FIG. 4, an data link 486 could also serve as a user-input interface and/or user-output interface for device 410. In one embodiment, infrared data link port 486, in interaction with an IR data modem, can be used over an IR data link and IR link interface. Such an IR data link can be used to interact device 410 with other communication devices or networks.

It is contemplated that remote data links other than those described and illustrated herein, could serve as user-input interfaces and user-output interfaces for the device. Internal components of such remote data links are fitted, for example by press-fitting or snap-fitting into the material so that the components maintains their integrity while the material is shapeable.

In one embodiment, the device's shape can be used to indicate or initiate the device's mode of operation or the device's function at a given time. For example, the device 310 in the configuration shown in FIG. 3 can be the device in an "OFF" mode of operation. In this case, for example, the device can have the processor in a standby mode or the power source in an "OFF" mode. Then when the device is stretched to the configuration shown in FIG. 4, the device 410 can be in an "ON" mode in which the processor can be actively functioning or the power source can be actively outputting power. The device can be programmed so that each configuration indicates a mode of operation, for example, a first configuration (such as an expanded mode or a bent cylinder) corresponds to "ON", a second configuration (such as a compressed mode or a straight cylinder) to "OFF" and a third configuration (such as a sphere, for example) to "MUTE". In all configurations, components of the communication module are fitted into the shapeable shell, for example by press-fitting or snap-fitting, so that the components maintain their integrity and any necessary connections while the shapeable shell is shaped into an appropriate configuration.

Figure 5:
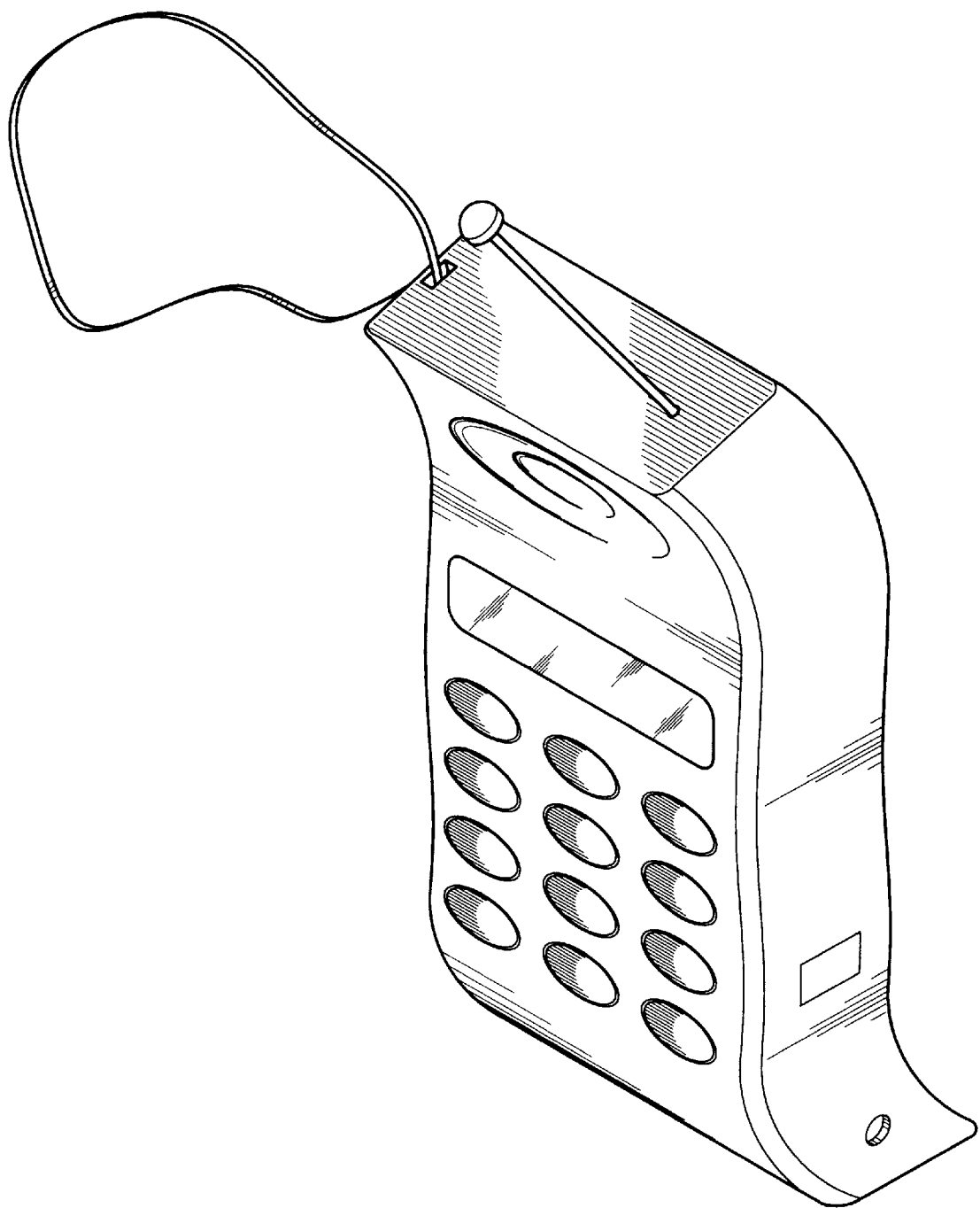
FIG. 5 is a perspective view of the shapeable communication device of FIG. 1 in a fourth configuration.

FIG. 5 shows another configuration of the shapeable communication device of the present invention. In the configuration of FIG. 5, the material or case 520 of device 510 is shaped into a side-to-side or front-to-back S-shape, or can be shaped into a triangle that can be suitably stable for placing on a table for a conference or speaker call. As indicated above, the shape of the device of the present invention can indicate the function of the device at a given time. Thus, when the device 410 is shaped as shown in FIG. 4, the call can be a private person-to-person call. Then, the device can be re-shaped to a triangle configuration indicating a conference call. Additionally, as indicated above, in one embodiment of the invention, the shape of the device can also trigger a particular mode of operation. For example, the device as shown in FIG. 4 can be in a shape that triggers the "PERSONAL CALL" mode of operation. Then when the device is shaped into the triangle configuration, the "CONFERENCE CALL" or "SPEAKER PHONE" mode of operation can be triggered.

The components of the communication device of the present invention can be attached to the communication device in any suitable manner. For example, pre-defined openings can be made in material into which the components can be press-fitted, snap-fitted or otherwise fitted into. Alternatively, pre-defined pockets can be fitted into material into which the components can be press-fitted, snapfitted or otherwise fitted into. The material between the pre-defined openings or pockets is shapeable but the components maintain their integrity and also their connectivity. In a preferred embodiment, the components are of significantly reduced size.

The shapeable communication device of the present invention can be shaped, expanded and contracted into any suitable shape besides those illustrated here. The device can also be programmed for a variety of communication modes in addition to those described herein.

Figure 6:
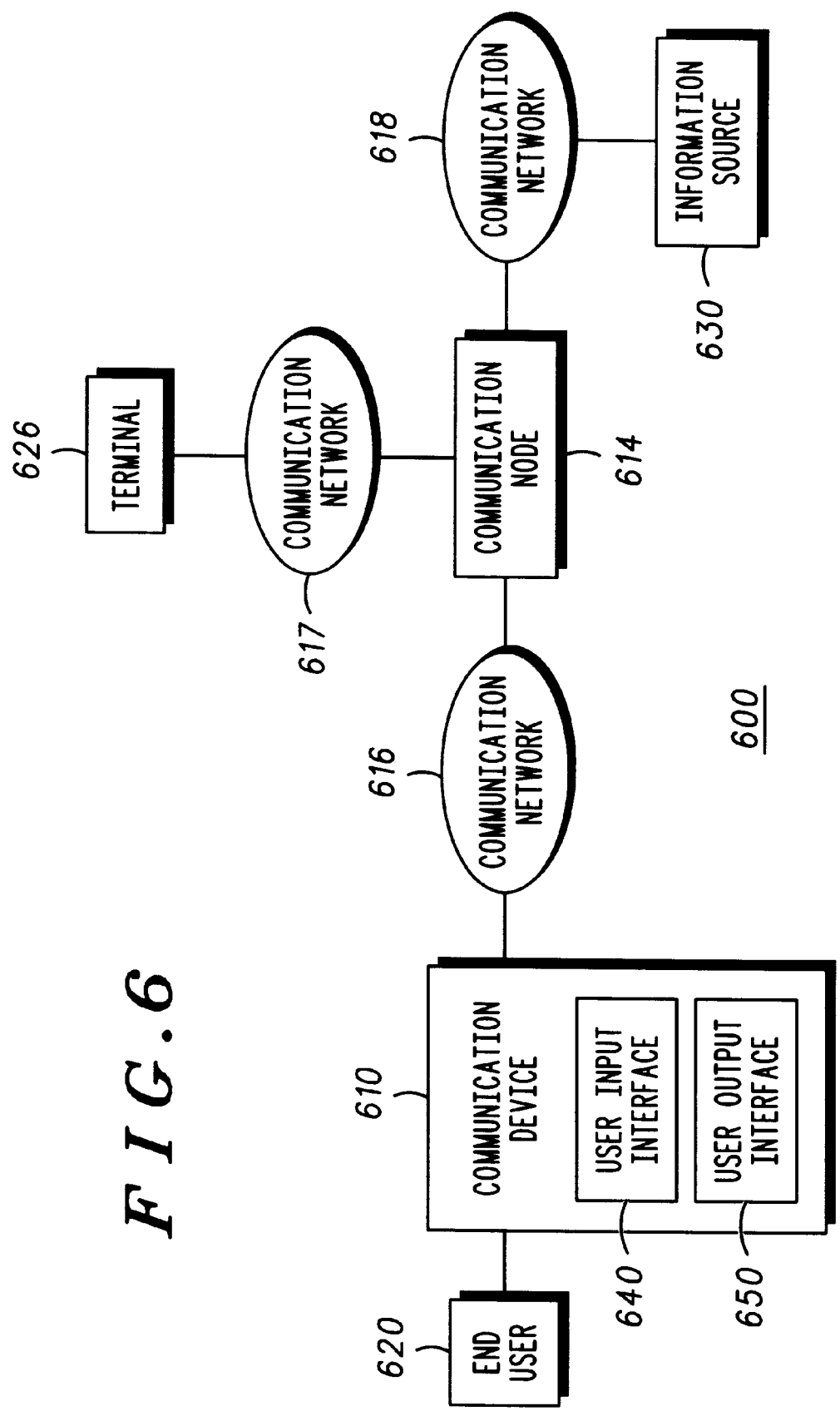
FIG. 6 is a block diagram of one embodiment of a communications system incorporating the shapeable communication device of the present invention.

The shapeable communication device of the present invention can function as a portable standalone device, and can further be incorporated into a communication system, such as shown at 600 in FIG. 6. Communication system 600 has the capability to transmit information to a communication device 610, such as shapeable communication device of the present invention.

FIG. 6 is a block diagram that illustrates an embodiment of a communication system 600 which can be used to transmit information to and from the shapeable wireless device of the present invention. The communication system 600 generally includes one or more communication devices 610, and one or more network access devices, including, for example, the terminal shown at 626, communication networks 617, 618, 619 a communication node 614 and an information source 630.

The communication system 600 provide various services and capabilities to cellular end users, wire-line telephone end users, paging end users, satellite end users, mobile or portable telephone end users, trunked end users, computer network end users (e.g., Internet or Intranet end users), wireless data end users, branch office users and the like. The interconnections can be wired or wireless.

The communication device 610 communicates with the communication node 614 via one or more of communication networks 617, 618, 619. The communication network 617, 618, 619 can interface with the communication device 610 through wireline or wireless networks or systems (i.e., telephone or televisions systems, Integrated Services Digital Network (ISDN) systems, coaxial lines, computer networks, digital end user lines, private networks, wireless local loop systems, etc.).

The communication networks 617, 618, 619 of the communication system 600 include, but are not limited to, intranets, extranets, Internets, Local Area Networks (LAN), telephone networks, (e.g., Public Switched Telephone Networks (PSTN), private telephone networks, etc.), cellular networks, satellite networks, personal communication systems, TV networks (e.g., cable TV systems), local, regional, national or global paging networks, e-mail systems, wireless data networks (e.g., satellite data or local wireless data networks), wireless LANs, wireless local loop/distribution systems (e.g., LMDS, MMDS or Code Division Multiple Access (CDMA) based systems), Voice Over Internet Protocol (VOIP) networks, or any other suitable network. The communication networks 617, 618, 619 also include wide area networks (WAN), such as, for example, the Internet, the World Wide Web (WWW) or any other similar on-line service. It will be recognized that the communication networks 617, 618, 619 can have portions in common, can comprise two separate networks, or can be the same network.

The communication node 614 of the communication system 600 include, but is not limited to, an interactive voice response node, a server computer, the MIX™ platform and the Myosphere™ Service provided by Motorola, Inc. of Schaumburg, Ill, or any other suitable system. It will be recognized that the communication node 614 can be integrated within or can be remote from the communication networks 617, 618, 619. The communication node 614 provide information to one or more end users 620.

Further information regarding communication system 600 is disclosed in U.S. patent application Ser. No. 09/141,485, entitled "Telecommunication System and Methods Therefor", filed Aug. 27, 1998, the entire disclosure of which is incorporated herein.

It should be appreciated that the embodiments described above are to be considered in all respects only illustrative and not restrictive. The scope of the invention is indicated by the following claims rather than by the foregoing description. All changes that come within the meaning and range of equivalents are to be embraced within their scope.

We claim:

1. A shapeable radiotelephone device, comprising:
   a continuous, one-piece flexible body portion comprising a shapeable material to allow the body portion to be configured to a desired configuration; and
   a communication module operably attached to the body portion to allow communication.

2. The device of claim 1 wherein the communication module is a wireless cellular transceiver.

3. The device of claim 1 wherein the shapeable material is selected from the group consisting of:
   gels, gels contained within a pack, putty, putty contained within a pack, sand contained within a pack, bendable plastic, plastic, polyurethane, polyurethane film, filled polyurethane film, beads or shapeable foam.

4. The device of claim 1 wherein the communication module comprises a plurality of components in communication with a transceiver.

5. The device of claim 4 wherein the transceiver is a wireless transceiver.

6. The device of claim 4 wherein the components are selected from the group consisting of:
   a card interface, a touch sensitive screen, a keypad, a data link, a scanner, an electroacoustic device, a voice communication device, a display screen, an audio device, a speaker, an electroacoustic transducer, an antenna, an infrared frequency link, a short-range radio frequency link, and a cellular frequency link.

7. The device of claim 1 wherein the communication module is attached by press-fitting the module into at least one opening in the shapeable material.

8. The device of claim 1 wherein the communication module is attached by shape-fitting the module into at least one opening in the shapeable material.

9. The device of claim 1 further comprising an input component wherein the input component is selected from the group consisting of:
   a card interface, a touch sensitive screen, a keypad, a data link, a scanner, an electroacoustic device, and voice communication device.

10. The device of claim 1 further comprising an output component, wherein the output component is selected from the group consisting of:
    a display screen, an audio device, a speaker, and an electroacoustic transducer.

11. The device of claim 1 further comprising a data link wherein the data link is selected from the group consisting of:
    an antenna, an infrared frequency link, a short-range radio frequency link, and a cellular frequency link.

12. The device of claim 1 wherein the configuration of the body portion activates a mode of operation of the device.

13. A shapeable radiotelephone device comprising the steps of:
    providing a continuous, one-piece flexible shapeable communication device in a first configuration wherein the first configuration corresponds to a first mode of operation; and changing to a second configuration wherein the second configuration corresponds to a second mode of operation.

14. The method of claim 13 wherein the first mode of operation is selected from the group consisting of:

an on mode, an off mode, a conference mode, a hold mode, a privacy mode, and a recharging mode.

15. The method of claim 13 wherein the second mode of operation is selected from the group consisting of:

an on mode, an off mode, a conference mode, a hold mode, a privacy mode, and a recharging mode.

16. A shapeable radiotelephone device comprising:

a body portion comprising a continuous, one-piece flexible shapeable material;

a communication module operably attached to the body portion, the communication module including a transceiver;

at least one user interface operably attached to the transceiver, the user interface operatively adapted to recognize the unique identification; and at least one power source operably attached to the transceiver.

17. A shapeable radiotelephone device comprising:

a body portion comprising a continuous, one-piece flexible shapeable material;

a communication module operably attached to the body portion;

the communication module including a transceiver, the transceiver having a unique identification; and at least one user interface in communication with the transceiver, the user interface operatively adapted to recognize the unique identification.

18. The device of claim 17 further comprising:

at least one remote data link in communication with the transceiver, the remote data link operatively adapted to recognize the unique identification.

19. The device of claim 17 wherein the user interface is selected from the group consisting of:

a card interface, a touch sensitive screen, a keypad, a data link, a scanner, an electroacoustic device, a voice communication device, a display screen, an audio device, a speaker, an electroacoustic transducer, an antenna, an infrared frequency link, a short-range radio frequency link, and a cellular frequency link.

20. The device of claim 17 further comprising a power source, the power source in communication with the transceiver.

21. The device of claim 17 further comprising a power source in communication with the user interface.

22. The device of claim 17 wherein the device has a first and a second configuration, the first configuration corresponding to a first mode of operation of the transceiver; and the second configuration corresponding to a second mode of operation of the transceiver.

23. The device of claim 20 wherein the device has a first and a second configuration, the first configuration corresponding to the power source being on; and the second configuration corresponding to the power source being off.

24. A communication system, comprising:

a shapeable radiotelephone device, the device comprising a continuous, one-piece flexible shapeable material incorporating a communication module;

at least one remote data link in communication with the device; and at least one interface in communication with a communication network and in remote communication with the radiotelephone device.

25. The system of claim 24 wherein the network is selected from the group consisting of:

an intranet, an extranet, an Internet, a local area network, a telephone network, a cellular network, a satellite network, a personal communication system, a TV network, a paging network, an e-mail system, a wireless data networks, a wireless local area network, a wireless local loop/distribution system, and a voice over internet protocol network.

26. The system of claim 24 wherein the radiotelephone device is selected from the group consisting of:

a mobile telephone, a paging unit, a radio unit, a wireless data device, a Web telephone, a portable telephone, a wireless telephone, a personal information management device, a personal digital assistant, a personal computer, a network television, an Internet television, an Internet telephone, a portable wireless device, a security system, an information appliances, an e-commerce appliance and a workstation.

* * * * *

UNITED STATES PATENT AND TRADEMARK OFFICE
CERTIFICATE OF CORRECTION

PATENT NO.    : 6,453,155 B1
DATED         : September 17, 2002
INVENTOR(S)   : Hill et al.

It is certified that error appears in the above-identified patent and that said Letters Patent is hereby corrected as shown below:

Column 8,
Line 62, before "A shapeable radiotelephone", insert -- A method of using --.
Line 65, reads "communication device", should read -- radiotelephone device --.

Signed and Sealed this

Thirty-first Day of August, 2004

JON W. DUDAS
*Director of the United States Patent and Trademark Office*